United States Patent Office 2,902,497
Patented Sept. 1, 1959

2,902,497

17-ALKYL-17β-HYDROXYESTRAN-3-ONES

Frank B. Colton, Chicago, Ill., assignor to G. D. Searle & Co., Chicago, Ill., a corporation of Delaware No Drawing. Application June 21, 1956
Serial No. 592,710

1 Claim. (Cl. 260—397.4)

The present invention relates to a new group of steroidal anti-hypertensive agents and, more particularly, to lower 17α-alkyl-17β-hydroxyestran-3-ones of the structural formula

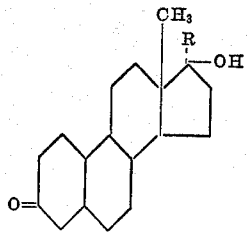

wherein R is a lower alkyl group containing 3 to 8 carbon atoms.

In my U.S. Patent 2,721,871, issued October 25, 1955, there are described certain 17-alkyl derivatives of 19-nortestosterone which are highly potent anabolic agents and which also antagonize hypertension produced by the mineralocorticoid hormone desoxycorticosterone. It has now been found that on hydrogenation of those nortestosterone derivatives having at least a three-carbon alkyl group in the 17-position, there are obtained estrane derivatives which are even more potent hypotensive agents.

The compounds of this invention antagonize renal hypertension and hypertension produced by desoxycorticosterone. Unlike the nortestosterone derivatives from which they are derived, these compounds have little or no activity in anabolic assays. It has been found that if the group R in the structural formula above is an ethyl group, practically no anti-hypertensive activity is found in metacorticoid states in which the propyl homolog is highly active.

The preparation of the compounds of the present application is conveniently carried out by the hydrogenation of the corresponding 17α-alkyl-19-nortestosterones of my U.S. Patent 2,721,871. Such a nuclear hydrogenation can be carried out in the presence of catalysts such as palladium on charcoal.

The compounds which constitute this invention and the method for their preparation appears more fully in the following examples. However, the invention is not to be construed as limited in spirit or in scope by the details set forth. It will be obvious to those skilled in the art that numerous modifications in procedure, catalysts, solvents and conditions can be adopted without departing from the scope of the invention. In the examples, quantities are given in parts by weight and temperatures in degrees centigrade (° C.).

*Example 1*

A mixture of 475 parts of 17α-propyl-19-nortestosterone, 100 parts of 5% palladium-on-charcoal catalyst and 6000 parts of dioxane are maintained in an atmosphere of hydrogen at 25° C. for an hour during which time one mole of hydrogen is absorbed. The solution is then filtered and the filter cake is washed with methanol. The filtrate and the washings are combined and heated to 85° C. Then water is added to incipient turbidity. On chilling a precipitate forms which is collected on a filter. Recrystallized from acetone, the 17α-propyl-17β-hydroxyestran-3-one thus obtained melts at about 171–173° C.

*Example 2*

To a solution of 97 parts of 17α-butyl-19-nortestosterone in 150 parts of dioxane are added 20 parts of 5% palladium-on-charcoal catalyst and the mixture is maintained at 30° C. in an atmosphere of hydrogen until one mole of hydrogen has been absorbed. The solution is then filtered and the charcoal is rinsed with methanol. The combined solutions are heated to about 80° C. and treated with water to the point of cloudiness. On storage at 0° C. the 17α-butyl-17β-hydroxyestran-3-one is obtained as a precipitate. The infrared absorption spectrum of this product shows maxima at 2.8 and 5.9 microns.

*Example 3*

Hydrogenation of a dioxane solution of 125 parts of 17α-octyl-19-nortestosterone in the presence of 20 parts of 5% palladium-on-charcoal catalyst and workup as in the preceding examples yields 17α-octyl-17β-hydroxyestran-3-one. The infrared absorption spectrum shows maxima at 2.8 and 5.9 microns.

What is claimed is:

17α-propyl-17β-hydroxyestran-3-one.

References Cited in the file of this patent

UNITED STATES PATENTS

| | | |
|---|---|---|
| 2,721,871 | Colton | Oct. 25, 1955 |
| 2,756,244 | Djerassi | July 24, 1956 |